United States Patent Office 3,207,891
Patented Sept. 21, 1965

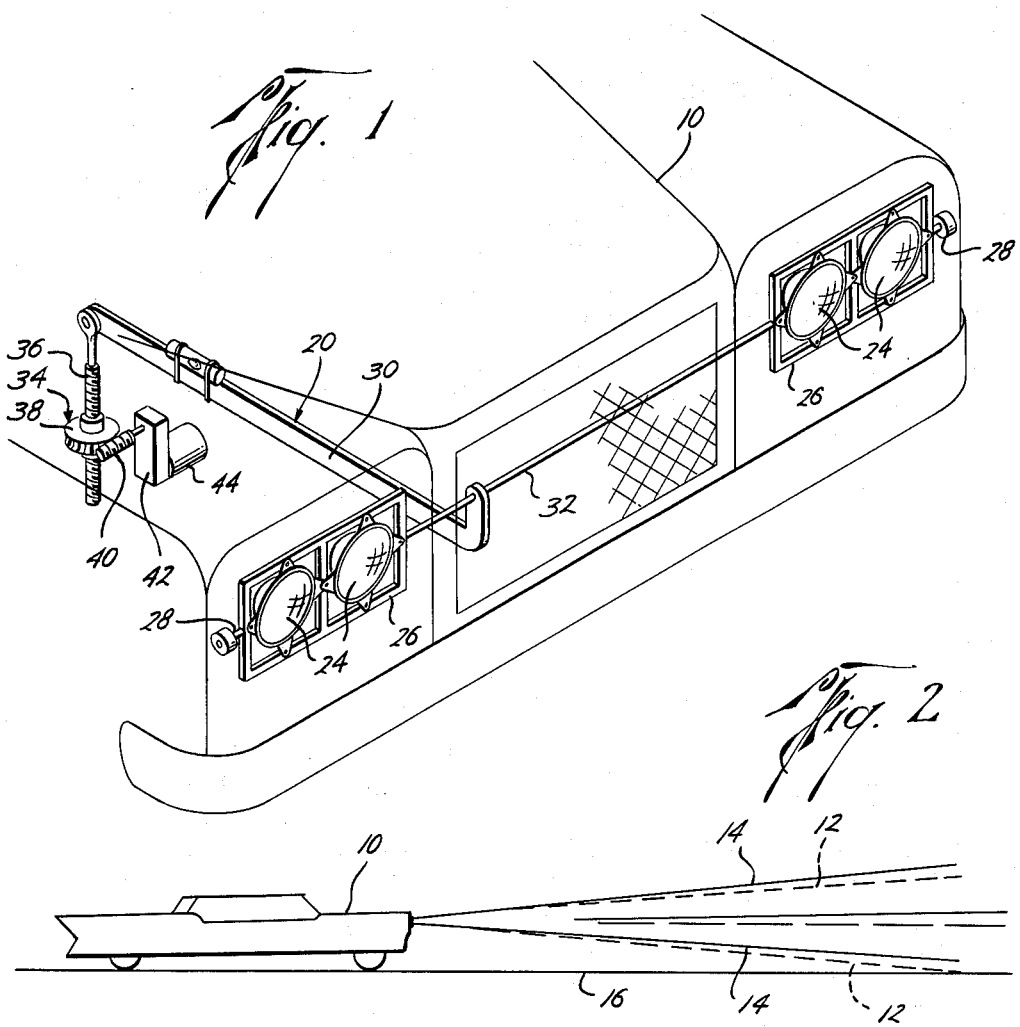
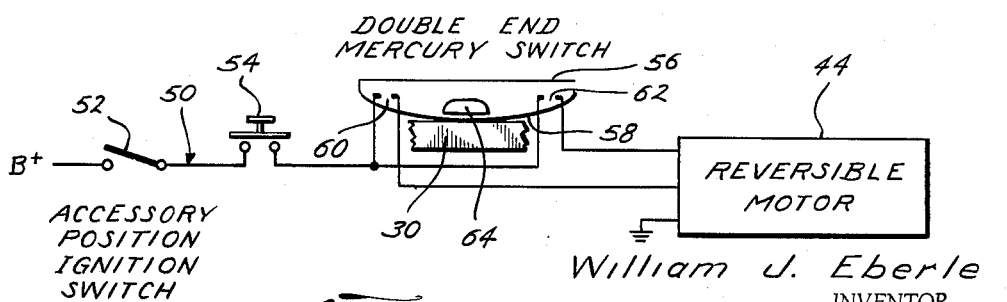

3,207,891
APPARATUS FOR VERTICALLY ADJUSTING HEADLIGHTS
William J. Eberle, Dallas, Tex., assignor, by mesne assignments, of fifty percent to Vitalic Battery Co., Inc., a corporation of New York
Filed July 1, 1963, Ser. No. 291,739
4 Claims. (Cl. 240—7.1)

The present invention relates to an apparatus for vertically adjusting headlights on vehicles, and more particularly, relates to an apparatus for adjusting headlights by leveling the headlights in a vertical plane regardless of the longitudinal tilt of the vehicle.

Because of the change in loading of a car or truck, frequently the longitudinal axis of the vehicle changes so that it is no longer parallel to the driving surface. When this occurs, the headlights of the vehicle will be incorrectly aligned in a vertical plane and will in the case of overload of the vehicle blind the oncoming drivers. And in the case of underload on a vehicle having overload springs the vehicle lights will not give the driver sufficient visibility. The present invention is directed towards an apparatus for adjusting the headlights of a vehicle so that they can be place in a level position regardless of the longitudinal axis of the vehicle.

It is therefore a general object of the present invention to provide an apparatus for vertically adjusting headlights on a vehicle by pivotally mounting the headlights on the vehicle for rotation about a horizontal axis and providing control means for suitably rotating the headlights to the desired position.

A still further object of the present invention is the provision of an improvement in an apparatus for vertically adjusting headlights which are pivotally mounted on a vehicle by providing a rotatable lever connected to the headlights, the position of which is controlled by a double ended mercury switch which will detect and control means for leveling the lever and headlights.

Yet a further object of the present invention is the provision of an apparatus for vertically adjusting headlights on a vehicle wherein the headlights are rotatably mounted for movement about a horizontal axis and providing a leveler means which is actuated by a high mechanical advantage mechanism for providing sensitive adjustment for the headlights.

Still a further object of the present invention is the provision of an apparatus for vertically adjusting headlights on a vehicle wherein the lights are pivotally mounted on the vehicle for rotation about a horizontal axis and a lever is connected to the headlights for rotating and positioning the lights and an electrical circuit for controlling the position of the lever is provided which includes a double ended mercury switch connected to the lever at the end remote from the headlight which controls a reversible motor which in turn actuates a suitable mechanical advantage means for placing the lever in a level position when the control circuit is energized.

Other and further objects, features and advantages will be apparent from the following description of a presently preferred embodiment of the invention, given for the purpose of disclosure, and taken in conjunction with the accompanying drawing, where like character references designate like parts throughout the several views, and where, FIGURE 1 is a fragmentary perspective view showing the present invention in place on a vehicle, FIGURE 2 is an elevational view showing the effect of changes in load on the vertical positioning of headlight beams from a vehicle, and FIGURE 3 is an electrical schematic illuminating the electrical control circuit of the present invention.

Referring now to FIGURE 2, the effects of a change in the longitudinal axis of a vehicle 10 on the headlight beam are best seen. The normal and desired headlight beam is shown by the dotted lines 12 showing the vertical outline of the headlight beams. However, with the vehicle overloaded and its back tilted downwardly, the outline of the beams is indicated at 14. Obviously, a slight tilt in the longitudinal axis of the vehicle 10 will be greatly magnified thereby causing the extreme outer reach of the headlight beam to be grossly misaligned. It is obvious that the misalignment can be in a downward direction as well as in an upward direction in a vehicle such as one having overload springs that is unloaded. The present invention is directed to providing an adjustable control means for quickly, inexpensively, and accurately aligning the headlight beam to be positioned as indicated by the outline 12 regardless of the longitudinal tilt of the vehicle 10.

Referring now to FIGURE 1, the reference numeral 20 generally indicates the vertical adjusting headlight apparatus of the present invention which is adapted to be suitably connected to a vehicle 10. The conventional headlights 24 may be suitably mounted on frames 26 and supported from the vehicle 10 by pivots 28 whereby the headlights 24 may be rotated about a horizontal axis for adjustment.

A lever 30 is provided which is secured to the headlights 24 such as through a rod 32 which is in turn connected to the frame 26 whereby the lights 24 may be vertically rotated in response to movement of the lever 30. Since a rotation of a few degrees will cause a considerable vertical movement of the headlight beams at their extremity furtherest from the vehicle, it is necessary to accurately control the positioning movement of the lever 30. Therefore, a control mechanism having a high mechanical advantage should be provided for this purpose. One way to increase the sensitivity is to lengthen the lever 30 as far as practicable. Of course, limitations in the design of the vehicle will prevent any extreme extension of this lever 30. Therefore, a raising and lowering mechanism 34 having a high mechanical advantage is provided. Thus, a worm gear 36 may be provided which is connected to the outer end of the lever 30 and which is in turn moved upwardly and downwardly in response to the movement of a rotatable gear 38. The rotatable or driven gear 38 may be in turn rotated and controlled by another worm gear 40 which is in turn driven from a gear reduction unit 42 and reversible motor 44. These latter components are all conventional items and no further description is believed to be necessary.

Referring now to FIGURE 3, the control circuit, generally indicated by the numeral 50, is best seen. The circuit 50 is connected to the battery at B+ and to ground to provide the necessary electrical source for the circuit. An accessory position ignition switch 52 may be provided, if desired, to provide energization of the circuit only when desired. A control switch 54 is provided for energizing the circuit which may be a normally open push button type switch, and if desired switch 52 may then be omitted. However, the switch 52 is an added safety feature which will prevent accidently energizing the control circuit 50 while the vehicle is in motion by accidently actuating switch 54. A double ended mercury switch 56 is provided which generally includes a slightly curved bottom 58 and normally open contacts 60 and 62 at opposite ends of the switch. When the switch is level the mercury 64 will remain in the center of the switch 56 and the contacts 60 and 62 will remain open. However, when the switch is tilted to one end or the other the mercury 64 will move between and close the contacts at the low end of the switch 56 thereby actuating the reversible motor 44 in a direction to act through the mechanical advantage mechanism 34 and change the position of the lever 30 so as to move the mercury switch to a level position thereby de-energizing the electrical contacts 60 and 62. It is noted that the double ended mercury switch 56 is positioned on the lever 30 preferably adjacent the end remote from the headlights to provide a sensitive actuation switch for maintaining the lever 30 and thus the headlights 24 in a level position regardless of the position of the longitudinal axis of the vehicle 10. And of course, the bottom 58 of the switch 56 would be only slightly curved to provide a sensitive control of the position of the lever 30 and the lights 24. In addition the switch 56 may be adjustably secured (not shown) or connected other than parallel to the lever 30 so as to compensate for an unlevel position of the lever 30 in the event the apparatus 20 must be mounted with the lever 30 in an unlevel position.

In use, the headlights 24 are normally suitably adjusted to provide a normal headlight beam as indicated by the outline 12 in FIGURE 2 when the vehicle 10 is in a level position. However, as soon as the longitudinal axis of the vehicle changes the vertical projection of the headlight beam also changes from the desired level position. The present apparatus 20 may then be used to properly align the headlight beam with reference to the road surface 16, assuming that the road surface is level and is not inclined.

The switches 52 and 54 are actuated thereby energizing the control circuit 50. Since the vehicle 10 is tilted the lever 30 will also be tilted and the mercury 64 in the switch 56 will be at one end thereby closing one of the contacts, such as 60 to energize the reversible motor which in turn rotates the mechanical advantage mechanism 34 in a direction to move the lever 30, mercury switch 56 and consequently the headlights 24 back to a level position. When the level position is reached the mercury 64 will again move to the center of the double ended mercury switch 56 thereby opening the contacts 60 and stopping the reversible motor 44. Of course, if the vehicle is tilted in the other direction, the mercury would have moved to the opposite end of the switch 56 closing the contacts 62 causing the reversible motor to operate in the opposite direction, but still moving the lever 30 and headlights 24 to a level position by rotating them around the pivoted mounts 28 and operating them in the same manner.

The present invention, therefore, is well adapted to carry out the objects and attain the ends and advantages mentioned as well as others inherent therein. While a presently preferred embodiment of the invention is given for the purpose of disclosure, numerous changes in details of construction and arrangement of parts may be made which will readily suggest themselves to those skilled in the art and which are encompassed within the spirit of the invention and the scope of the appended claims.

What is claimed is:

1. An apparatus for vertically adjusting headlights on a vehicle comprising,
    means pivotally mounting said headlights on said vehicle for rotation about a horizontal axis,
    lever means connected to said headlights,
    a double ended electrical mercury switch connected to said lever,
    means for raising and lowering the free end of said lever thereby rotating the headlights,
    reversible motor means connected to and moving said raising and lowering means and connected to and actuated by said mercury switch, and
    means electrically connected in series with said mercury switch and motor for energizing said apparatus.

2. In an apparatus for vertically adjusting headlights on a vehicle wherein said headlights are pivotally mounted on said vehicle for rotation about a horizontal axis, the improvement in a vertically adjusting mechanism comprising,
    a lever having first and second ends, one end of which is secured to said headlights,
    raising and lowering means connected to the other end of the lever for rotating the headlights, and
    an electrical control circuit including,
        an on-off switch energizing said control circuit,
        a double ended electrical mercury switch connected to said lever adjacent said other end for detecting when the lever is unlevel and in which direction, and
        a reversible motor connected to and actuated by said mercury switch and to and moving said raising and lowering means.

3. An apparatus for vertically adjusting headlights on a vehicle comprising,
    means pivotally mounting said headlights on said vehicle for rotation about a horizontal axis,
    a lever having first and second ends, the first end of which is fixedly secured to said headlights and extends transversely from a plane containing said headlights so that the lights will be rotated about said pivot means when the second end of said lever is moved,
        a switch connected in said circuit and energizing said control circuit,
        a double ended electrical mercury switch connected to said lever adjacent said second end, and
        a reversible motor connected to said mercury switch and adapted to be actuated in opposite directions depending on when said lever and mercury switch are unlevel and in which direction, and
    raising and lowering means connected to said second end of the lever and to said motor for placing the lever in a level position when the control circuit is energized.

4. The invention of claim 3 wherein said raising and lowering means includes means for increasing the mechanical advantage comprising,
    a first worm gear,
    a driven gear engaging said first worm gear, and
    a second worm gear being driven by said driven gear.

References Cited by the Examiner

UNITED STATES PATENTS

| 1,722,268 | 7/29 | Biertuempfel | 240—7.1 X |
| 2,542,211 | 2/51 | Sauri | 240—61.47 X |
| 2,846,551 | 8/58 | Linder et al. | 240—7.1 X |
| 2,876,384 | 3/59 | Brown | 240—25 X |
| 3,177,355 | 4/65 | Trowbridge | 240—7.1 |

OTHER REFERENCES

Neuhaus et al.: German application 1,131,109, printed June 7, 1962 (Kl 63c 66/01).

NORTON ANSHER, *Primary Examiner.*